United States Patent
Ohtomo et al.

(10) Patent No.: US 11,598,874 B2
(45) Date of Patent: Mar. 7, 2023

(54) SURVEYING INSTRUMENT AND SURVEYING INSTRUMENT SYSTEM

(71) Applicant: TOPCON Corporation, Tokyo-to (JP)

(72) Inventors: Fumio Ohtomo, Saitama (JP); Kaoru Kumagai, Tokyo-to (JP); Tetsuji Anai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 8 days.

(21) Appl. No.: 17/202,692

(22) Filed: Mar. 16, 2021

(65) Prior Publication Data

US 2021/0293962 A1   Sep. 23, 2021

(30) Foreign Application Priority Data

Mar. 18, 2020 (JP) .............................. JP2020-047264

(51) Int. Cl.
*G01S 17/89* (2020.01)
*G01S 7/48* (2006.01)
(Continued)

(52) U.S. Cl.
CPC ............ *G01S 17/89* (2013.01); *G01S 7/4808* (2013.01); *G01S 17/42* (2013.01); *H04N 5/247* (2013.01)

(58) Field of Classification Search
CPC ........ G01S 7/4817; G01S 17/42; G01S 17/89; G01S 17/66; G01S 17/86; G01S 7/4808;
(Continued)

(56) References Cited

U.S. PATENT DOCUMENTS 6,563,574 B2    5/2003   Ohtomo et al.
2002/0085193 A1  7/2002   Ohtomo et al.
(Continued)

FOREIGN PATENT DOCUMENTS

JP    2002-202126 A    7/2002
JP    2006-503275 A    1/2006
(Continued)

OTHER PUBLICATIONS

European communication dated Aug. 11, 2021 in corresponding European patent application No. 21162852.4.

*Primary Examiner* — Farhan Mahmud
(74) *Attorney, Agent, or Firm* — Nields, Lemack & Frame, LLC

(57) ABSTRACT

There is provided a surveying instrument including a distance measuring light projecting module, a light receiving module, an optical axis deflector provided in a common portion of a distance measuring optical axis and a light receiving optical axis, a projecting direction detector which detects an optical axis deflection angle and a deflecting direction, a narrow angle image pickup module for a narrow angle of view, a distance measurement arithmetic module, and an arithmetic control module, wherein the arithmetic control module controls the optical axis deflector and the distance measurement arithmetic module, the distance measurement arithmetic module performs a distance measurement of a measuring point based on a transmission signal of a measuring light and a reception signal of a measuring light, the narrow angle image pickup module acquires a narrow angle image with reference to the distance measuring optical axis, a sighting is performed every different objects, and an acquisition of the narrow angle image and a three-dimensional measurement are performed.

18 Claims, 10 Drawing Sheets

(51) Int. Cl.
*G01S 17/42* (2006.01)
*H04N 5/247* (2006.01)

(58) Field of Classification Search
CPC ......... G01S 17/08; G01C 15/002; G01C 3/08; G01C 15/00; A61B 3/102; G01B 11/002; G01B 9/02091; G01B 11/026; G02B 26/10

See application file for complete search history.

(56) References Cited

U.S. PATENT DOCUMENTS

| | | |
|---|---|---|
| 2004/0109487 A1 | 6/2004 | Zhang |
| 2006/0158423 A1 | 7/2006 | Kern et al. |
| 2016/0238708 A1 | 8/2016 | Ohtomo et al. |
| 2016/0259039 A1 | 9/2016 | Ohtomo et al. |
| 2017/0168142 A1 | 6/2017 | Kumagai et al. |
| 2018/0329040 A1* | 11/2018 | Ohtomo .................. G01S 3/782 |
| 2019/0154805 A1 | 5/2019 | Ohtomo et al. |
| 2019/0234733 A1 | 8/2019 | Nishita et al. |

FOREIGN PATENT DOCUMENTS

| | | |
|---|---|---|
| JP | 4356050 B2 | 11/2009 |
| JP | 2016-151423 A | 8/2016 |
| JP | 2016-161411 A | 9/2016 |
| JP | 2017-106813 A | 6/2017 |

\* cited by examiner

B-B ARROW VIEW

SURVEYING INSTRUMENT AND SURVEYING INSTRUMENT SYSTEM

BACKGROUND OF THE INVENTION

The present invention relates to a surveying instrument and a surveying instrument system which can measure an object by simple installation.

There is a total station as a surveying instrument. In the total station, an object is sighted by a telescope with high-magnification, which also serves as a distance measuring optical system, and the measurement is performed. Further, in the total station, the telescope is horizontally rotated/ vertically rotated, and different objects are sighted so that the measurement is sequentially performed in accordance with each of different objects.

However, the telescope for sighting has a high magnification and a narrow angle of view (a narrow angle), and the telescope itself has the large inertia. Further, a support mechanism of the telescope requires the high rigidity, and hence the support mechanism component also has the large inertia.

Therefore, when changing the object, it is difficult to horizontally rotate/vertically rotate the telescope at a high speed, to rapidly sight the object, and to acquire a sighting image, which is a problem for the work efficiency.

SUMMARY OF THE INVENTION

It is an object of the present invention to provide a surveying instrument and a surveying instrument system which can sight an object at a high speed and can quickly acquire a narrow angle image of a sighted position.

To attain the object as described above, a surveying instrument according to the present invention comprises a distance measuring light projecting module for projecting a distance measuring light, a light receiving module for receiving the reflected distance measuring light, an optical axis deflector provided in a common portion of a distance measuring optical axis and a light receiving optical axis and for integrally deflecting the distance measuring optical axis and the light receiving optical axis, a projecting direction detector for detecting an optical axis deflection angle and a deflecting direction provided by the optical axis deflector, a narrow angle image pickup module with a narrow angle of view having a narrow angle image pickup optical axis which is partially shared with the distance measuring optical axis, a distance measurement arithmetic module, and an arithmetic control module, wherein the arithmetic control module is configured to control the optical axis deflection of the optical axis deflector and a distance measurement operation of the distance measurement arithmetic module, the distance measurement arithmetic module is configured to perform the distance measurement of a measuring point based on a transmission signal of the distance measuring light and a photo detecting signal of the reflected distance measuring light, the narrow angle image pickup module is configured to acquire a narrow angle image with reference to the distance measuring optical axis, to sequentially sight every different objects, and to acquire narrow angle images and the three-dimensional measurement are performed.

Further, in the surveying instrument according to a preferred embodiment, wavelength dispersion compensation prisms include of a plurality of optical members with different wavelength characteristics are provided in a common portion of the distance measuring optical axis of the optical axis deflector and the narrow angle image pickup optical axis.

Further, in the surveying instrument according to a preferred embodiment, the optical axis deflector is configured to perform a local scan by deflecting or continuously deflecting the distance measuring optical axis within an angle-of-view range of the narrow angle image, and the arithmetic control module is configured to perform, more than once, a distance measurement while changing a sighting position or a distance measurement using the local scan and the narrow angle image acquisition while changing a sighting position.

Further, in the surveying instrument according to a preferred embodiment, a wide angle image pickup module with an angle of view equivalent to a maximum deflection range of the optical axis deflector is provided, wherein said arithmetic control module is configured to associate a wide angle image acquired by the wide angle image pickup module with the narrow angle image based on a detection result of a projecting direction of the distance measuring light detected by the projecting direction detector.

Further, a surveying system according to the present invention includes any one of the surveying instruments, which have been described above, installed on each of at least two installation points with a known relationship respectively, an object is sighted from respective installation points, a narrow angle image in each sighting direction is acquired, and the three-dimensional measurement of the narrow angle image is performed based on a distance measurement result from each installation point and the known relationship.

Further, in the surveying system according to a preferred embodiment, the surveying instrument further includes a wide angle image pickup module with an angle of view equivalent to a maximum deflection range of the optical axis deflector, and the arithmetic control module is configured to extract a common rough correspondence point from wide angle images acquired from the at least two installation points by the wide angle image pickup module, sight the rough correspondence point and acquire narrow angle images at the respective installation points, extract a precise correspondence point in the narrow angle images, acquire distance measurement results of the respective narrow angle images and the precise correspondence point, and perform a matching between the narrow angle images and a three-dimensional measurement in the narrow angle images based on the distance measurement result of the precise correspondence point.

Furthermore, in the surveying system according to a preferred embodiment, a GNSS is provided to the surveying instrument, the object is sighted from at least two positions, the three-dimensional measurement of the narrow angle image is performed, and a measurement result is calculated to a GNSS coordinate system.

According to the present invention, a surveying instrument comprises a distance measuring light projecting module for projecting a distance measuring light, a light receiving module for receiving the reflected distance measuring light, an optical axis deflector provided in a common portion of a distance measuring optical axis and a light receiving optical axis and for integrally deflecting the distance measuring optical axis and the light receiving optical axis, a projecting direction detector for detecting an optical axis deflection angle and a deflecting direction provided by the optical axis deflector, a narrow angle image pickup module with a narrow angle of view having a narrow angle image pickup optical axis which is partially shared with the distance measuring optical axis, a distance measurement arithmetic module, and an arithmetic control module, wherein the arithmetic control module is configured to control the optical axis deflection of the optical axis deflector and a distance measurement operation of the distance measurement arithmetic module, the distance measurement arithmetic module is configured to perform the distance measurement of a measuring point based on a transmission signal of the distance measuring light and a photodetecting signal of the reflected distance measuring light, the narrow angle image pickup module is configured to acquire a narrow angle image with reference to the distance measuring optical axis, to sequentially sight every different objects, and to acquire narrow angle images and the three-dimensional measurement are performed. As a result, a three-dimensional relationship between the narrow angle image and the sighting position can be instantaneously acquired.

DETAILED DESCRIPTION OF THE PREFERRED EMBODIMENTS

Figure 1:
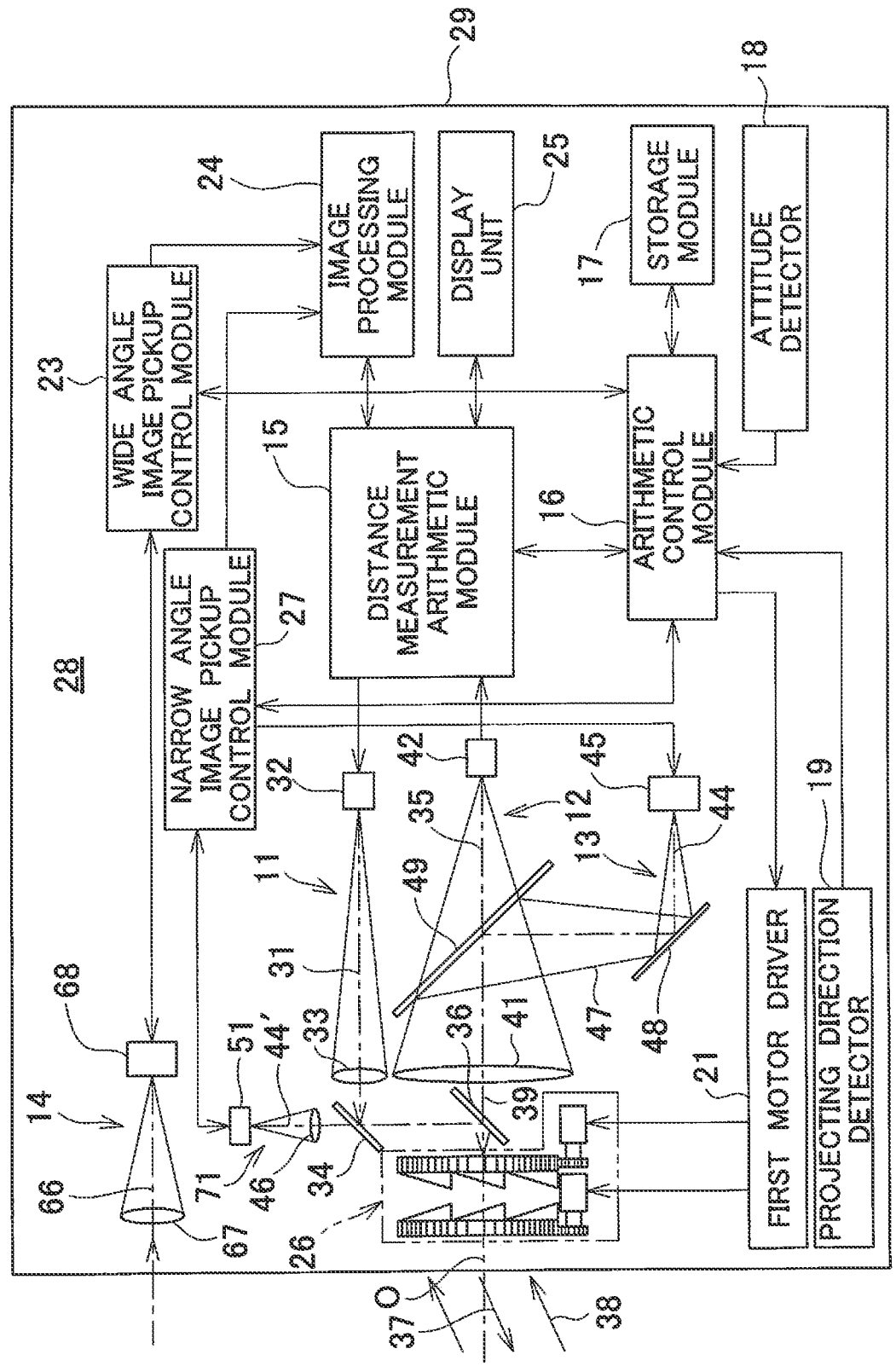
FIG. 1 is a schematic block diagram of a surveying instrument.

A description will be given below on embodiments of the present invention by referring to the attached drawings.

First, with reference to FIG. 1, a description will be given on a surveying instrument according to a first embodiment.

The surveying instrument 1 mainly includes a distance measuring light projecting module 11, a light receiving module 12, a detecting light projecting module 13, a wide angle image pickup module 14, a narrow angle image pickup module 71 (to be described later), a distance measurement arithmetic module 15, an arithmetic control module 16, a storage module 17, an attitude detector 18, a projecting direction detector 19, a motor driver 21, a wide angle image pickup control module 23, an image processor 24, a display unit 25, an optical axis deflector 26, and a narrow angle image pickup control module 27, and they are accommodated and integrated in a casing 29. It is to be noted that the distance measuring light projecting module 11, the light receiving module 12, the distance measurement arithmetic module 15, the optical axis deflector 26, and the like make up a distance measuring module 28 with a function as an electronic distance meter.

As each of the distance measurement arithmetic module 15 and the arithmetic control module 16, a CPU dedicated to this embodiment, a general-purpose CPU, an embedded CPU, a microprocessor, or the like is used. Further, as the storage module 17, a semiconductor memory such as a RAM, a ROM, or a Flash ROM, a magnetic recording memory such as an HDD, or an optical recording memory such as a CDROM is used.

In the storage module 17, various kinds of programs for carrying out the present embodiment are stored. The distance measurement arithmetic module 15 and the arithmetic control module 16 develop and execute the stored programs, respectively. Further, various kinds of data, e.g., measurement data and image data are stored in the storage module 17.

The arithmetic control module 16 controls the optical axis deflector 26 via the motor driver 21, Further, the arithmetic control module 16 controls a deflection of a distance measuring optical axis via the optical axis deflector 26, and performs an integration control over the distance measurement arithmetic module 15, the wide angle image pickup control module 23, and the narrow angle image pickup control module 27, a synchronous control for a distance measurement, an image pickup, and a detection of a retroreflective detecting light, and the like.

The attitude detector 18 detects a tilt of the surveying instrument 1 with respect to the horizontality or the verticality, and a detection result is input to the arithmetic control module 16. Further, as the attitude detector 18, a tilt detector such as a tilt sensor is used, and an attitude detection device disclosed in Japanese Patent Application Publication No. 2016-151423 may be used.

The distance measuring light projecting module 11 has a projecting optical axis 31. Further, the distance measuring light projecting module 11 has a light emitter 32, a light projecting lens 33 and a beam splitter 34 as a deflecting optical component, which are provided on the projecting optical axis 31, and a reflecting mirror 36 as a deflecting optical component provided on a light receiving optical axis 35 (as described later). The light emitter 32 is, for example, a laser diode (LD) which emits the distance measuring light 37 such as red light or near-infrared light onto the projecting; optical axis 31. Further, the projecting optical axis 31 is deflected by the beam splitter 34 and the reflecting mirror 36 so as to coincide with the light receiving optical axis 35. The reflecting mirror 36 has a shape which is approximately equivalent to or slightly larger than a light flux diameter of the distance measuring light 37, and approximately equivalent to each of wavelength dispersion compensation prisms 55 and 58 (which will be described later). The reflecting mirror 36 and the wavelength dispersion compensation prisms 55 and 58 occupy a limited portion with the light receiving optical axis 35 as a center.

The beam splitter 34 may be a half mirror, but a polarization beam splitter with polarization optical characteristics is desirable. For instance, the beam splitter 34 has optical characteristics for reflecting the S-polarized light and transmitting the P-polarized light therethrough.

The beam splitter 34 and the reflecting mirror 36 make up a projecting optical axis module.

The light emitter 32 pulse-emits a laser beam or burst-emits the laser beam. The distance measuring light projecting module 11 projects a pulsed laser beam (or a burst-emitted laser beam) emitted from the light emitter 32 as the distance measuring light 37. It is to be noted that the burst emission is disclosed in Japanese Patent Application. Publication No. 2016-161411. Further, the distance measuring light projecting module 11 inputs a timing signal for pulse-emitting or burst-emitting to the distance measurement arithmetic module 15 as a transmission signal of the distance measuring light.

A description will be given on the light receiving module 12. The reflected distance measuring light 38 from an object enters the light receiving module 12. The light receiving module 12 has the light receiving optical axis 35, and the projecting optical axis 31 deflected by the beam splitter 34 and the reflecting mirror 36 coincides with the light receiving optical axis 35.

It is to be noted that a state where the projecting optical axis 31 coincides with the light receiving optical axis 35 is determined as a distance measuring optical axis 39.

The optical axis deflector 26 is arranged on the reference optical axis O. The reference optical axis O is a straight optical axis transmitted through the center of the optical axis deflector 26. The reference optical axis O coincides with the projecting optical axis 31, the light receiving optical axis 35, a detecting light optical axis 44 (to be described later), and the distance measuring optical axis 39 when no deflection is performed by the optical axis deflector 26.

An focusing lens 41 is arranged on the light receiving optical axis 35 as transmitted through the optical axis deflector 26. Further, on the light receiving optical axis 35, a photodetector 42 is provided. The photodetector 42 is, e.g., an avalanche photodiode (APD) or an equivalent photoelectric conversion element.

The imaging lens 41 focuses the reflected distance measuring light 38 on the photodetector 42. The photodetector 42 receives the reflected distance measuring light 38, and produces a photodetecting signal. The photodetecting signal is input to the distance measurement arithmetic module 15. The distance measurement arithmetic module 15 performs a measurement of a distance to the object (optical wave distance measurement) based on a transmission signal of the distance measuring light 37 and a photodetecting signal of the reflected distance measuring light 38. As the signal of the distance measuring light 37 and the signal of the reflected distance measuring light 38, it is possible to use various kinds of signals, e.g., a light emission timing signal of the distance measuring light 37 and a photodetecting timing signal of the reflected distance measuring light 38, or a phase signal of the distance measuring light 37 and a phase signal of the reflected distance measuring light 38 (a phase difference signal).

It is to be noted that, as the measurement, a prism measurement in which the object has a retroreflective ability or a non-prism measurement in which the object has no retroreflective ability is performed.

The optical axis deflector 26, the focusing lens 41, the photodetector 42, and the like make up the light receiving module 12.

A description will be given on the detecting light projecting module 13. The detecting light projecting module 13 has the detecting light optical axis 44. Further, the detecting light projecting module 13 has a detecting light source 45, a reflecting mirror 48, a split mirror 49, the focusing lens 41, the reflecting mirror 36, and the optical axis deflector 26 which are arranged on the detecting light optical axis 44. The detecting light optical axis 44 is deflected by the reflecting mirror 46 and the split mirror 49 and coincides with the light receiving optical axis 35 and the distance measuring optical axis 39. Here, the focusing lens 41 functions as a projecting lens in the detecting light projecting module 13.

It is to be noted that, as the detecting light source 45 which emits a detecting light 47, a light emitting source such as a laser diode (LD) is used, and the detecting light 47 preferably has a wavelength equal or close to that of the distance measuring light 37. As the detecting light 47, a light with a red color to the near-infrared, e.g., a light in a wavelength band ranging from 650 nm to 850 nm is used. Further, as the detecting light source 45, a light beam emitted from the laser diode may be led through an optical fiber so that a projection end face of the optical fiber can be adopted as the detecting light source.

The detecting light 47 is turned to a parallel light flux by the focusing lens 41, transmitted through the optical axis deflector 26, and projected coaxially with the distance measuring light 37. A retroreflective detecting light reflected by the prism with a retroreflective ability of an object enters the optical axis deflector 26 coaxially with the reflected distance measuring light 38, and is transmitted through the optical axis deflector 26 and then reflected by the reflecting mirror 36.

The reflecting mirror 36 separates the retro reflective detecting light from the distance measuring optical axis 39, and superimposes the retroreflective detecting light on the narrow angle image pickup optical axis 44'. The beam splitter 34 is arranged on the narrow angle image pickup optical axis 44', and a focusing lens 46 and a narrow angle image pickup element 51 are arranged on the narrow angle image pickup optical axis 44'.

The distance measuring optical axis 39 and the narrow angle image pickup optical axis 44' are partly common, and the detecting light projecting module 13, the beam splitter 34, the focusing lens 46, the narrow angle image pickup element 51, and the like function as a narrow angle image pickup module 71 which acquires an image of a measuring point portion. The narrow angle image pickup module 71 acquires a narrow angle image in a predetermined image positional relationship (e.g., an image center) with reference to the distance measuring optical axis 39. Further, the distance measuring optical axis 39 and the narrow angle image pickup optical axis 44' coincide with the object from the optical axis deflector 26 as optical axes, and hence a narrow angle image becomes equal to a sighting image.

Further, the narrow angle image pickup element 51 picks up a retroreflective detecting light reflected by the retroreflective ability of an object as a part of the narrow image together with the object and a background light, and an acquired image data is input to the narrow angle image pickup control module 27. The retroreflective detecting light can be used as a feature image (or a feature point) at the time of the image matching.

The narrow angle image pickup element 51 is a CCD or a CMOS sensor which is an aggregation of pixels, and a position of each pixel on an image element can be identified. For example, each pixel has pixel coordinates in a coordinate system with the narrow angle image pickup optical axis 44' as an origin, and its position on the image element can be identified by the pixel coordinates. Each pixel outputs the pixel coordinates together with a light receiving signal to the arithmetic control module 16.

The narrow angle image pickup control module 27 is able to perform a timing control for turning on or off the detecting light source 45 so as to enable the retroreflective detecting light in the narrow angle image to be clarified. Further, some of functions of the arithmetic control module 16 may be allocated co the narrow angle image pickup control module 27.

Only a light transmitted through wavelength dispersion compensation prisms 55 and 58 as later-described enters the narrow angle image pickup element 51.

As described above, the detecting light projecting module 13, the focusing lens 46, the narrow angle image pickup element 51, and the like also function as a narrow angle image pickup module 71 which acquires an image of a measuring point portion. In this case, the detecting light optical axis 44 and the narrow angle image pickup optical axis 44' are equal to a narrow angle image pickup optical axis of the narrow angle image pickup module 71.

A description will be given on the optical axis deflector 26 by referring to FIG. 2, FIG. 3A, and FIG. 3B.

The optical axis deflector 26 is constituted of the pair of disk prisms 53 and 54. The disk prisms 53, 54 have discoid shapes with the same diameter respectively, and are concentrically arranged on the light receiving optical axis 35, orthogonally to the light receiving optical axis 35 and in parallel each other at a predetermined interval. The disk prism 53 is made with an optical glass, and has a plurality of prism columns arranged in parallel as a basic configuration and a wavelength dispersion compensation prism 55 arranged in a central portion. The wavelength dispersion compensation prism. 55 is a composite prism provided by attaching an optical prism 55a and an optical prism 55b to each other. It is to be noted that, in the drawing, the disk prism 53 has three prism columns (e.g., rod-shaped triangular prisms, which will be referred to as triangular prisms hereinafter) 56a, 56b and 56c.

Likewise, the disk prism 54 is made with an optical glass, has three prism columns 57a, 57b, and 57c (e.g., rod-shaped triangular prisms, which will be referred to as triangular prisms hereinafter) arranged in parallel as a basic configuration, and has a wavelength dispersion compensation prism 56 arranged in a central portion. The wavelength dispersion compensation prism 58 is a composite prism provided by attaching an optical prism 58a and an optical prism 58b to each other. It is to be noted that the triangular prisms 56a, 56b, and 56c and the triangular prisms 57a, 57b, and 57c all have the same optical deflection characteristics of the same deflection angle. Further, the wavelength dispersion compensation prisms 55 and 58 are fabricated in such a manner that their optical deflection characteristics become the same as the optical deflection characteristics of the triangular prisms 56a, 56b, and 56c and the triangular prisms 57a, 57b, and 57c.

The wavelength dispersion compensation prism 55 and the wavelength dispersion compensation prism 58 have the same configuration and are point-symmetrically arranged. Further, the size of each of the wavelength dispersion compensation prisms 55 and 56 (lengths of each of the triangular prisms 56a and 57a in a longitudinal direction and a width direction) is larger than a beam diameter of the distance measuring lights 37.

The wavelength dispersion compensation prism 55 and 58 are a distance measuring light deflector which is a first optical axis deflector through which the distance measuring light 37 is transmitted and from which the same is projected.

Further, portions excluding the wavelength dispersion compensation prisms 55 and 58 (both end portions of the triangular prisms 56a and 57a, the triangular prisms 56b and 56c, and the triangular prisms 57b and 57c) are a reflected distance measuring light deflector as a second optical axis deflector through which the reflected distance measuring light 38 is transmitted and which the same enters.

The disk prisms 53 and 54 are arranged in such a manner that they are rotatable independently and individually around the light receiving optical axis 35, respectively. By independently controlling the disk prism 53 and 54, rotating directions, rotation amounts, and rotation speeds of the disk prisms 53 and 54, the projecting optical axis 31 of the distance measuring light 37 as projected is deflected to an arbitrary direction. Further, the disk prisms 53 and 54 deflect the light receiving optical axis 35 of the reflected distance measuring light 38, which is received, in parallel with (coaxially with) the projecting optical axis 31.

An outer shape of each of the disk prisms 53 and 54 is a circular shape with the light receiving optical axis 35 (the reference optical axis O) as a center. Further, the spread of the reflected distance measuring light 38 is taken into consideration, and diameters of the disk prisms 53 and 54 are set in such a manner that a sufficient light amount can be acquired.

A ring gear 59 is fitted on an outer periphery of the disk prism 53, and a ring gear 61 is fitted on an outer periphery of the disk prism 54.

A driving gear 62 meshes with the ring gear 59, and the driving gear 62 is fixed to an output shaft of a motor 63. Likewise, a driving gear 64 meshes with the ring gear 61, and the driving gear 64 is fixed to an output shaft of a motor 65. The motors 63 and 65 are electrically connected with the motor driver 21.

As the motors 63 and 65, motors capable of detecting rotation angles are used, or motors rotating in correspondence with driving input values, e.g., pulse motors are used. Alternatively, rotation angle detectors which detect rotation amounts (rotation angles) of the motors, e.g., encoders may be used for detecting rotation amounts of the motors 63 and 65. The rotation amounts of the motors 63 and 65 are detected respectively, and the arithmetic control module 16 individually controls the motors 63 and 65 through the motor driver 21. It is to be noted that the encoders may be directly mounted on the ring gears 59 and 61, respectively in such a manner that rotation angles of the ring gears 59 and 61 are directly detected by the encoders.

The driving gears 62 and 64 and the motors 63 and 65 are provided at positions where they do not interfere with other constituent components, such as the distance measuring light projecting module 11, for example, below the ring gears 59 and 61.

Figure 3A:
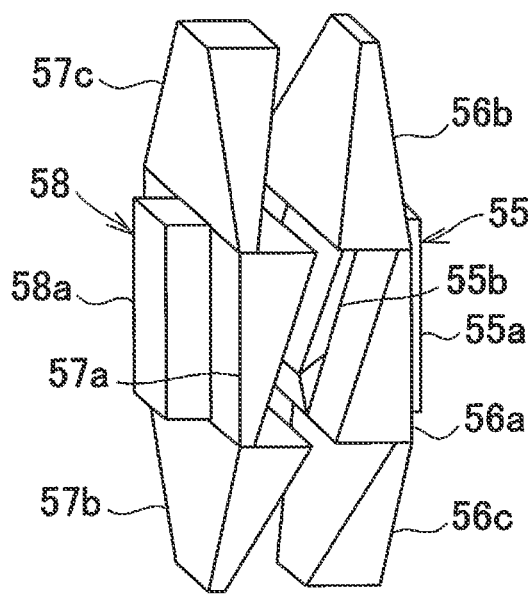
FIG. 3A is a perspective view of the optical axis deflector.
Figure 3B:
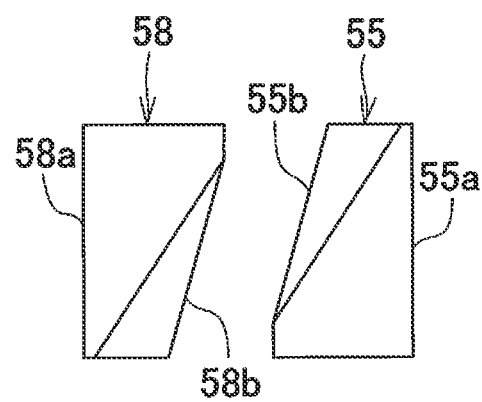
FIG. 3B is an enlarged view of a principal part of wavelength dispersion compensation prisms.

As shown in FIG. 3B, the wavelength dispersion compensation prism 55 is constituted by attaching the two optical prisms 55a and 55b with different wavelength characteristics (dispersion amounts, refraction indexes).

Figure 4:
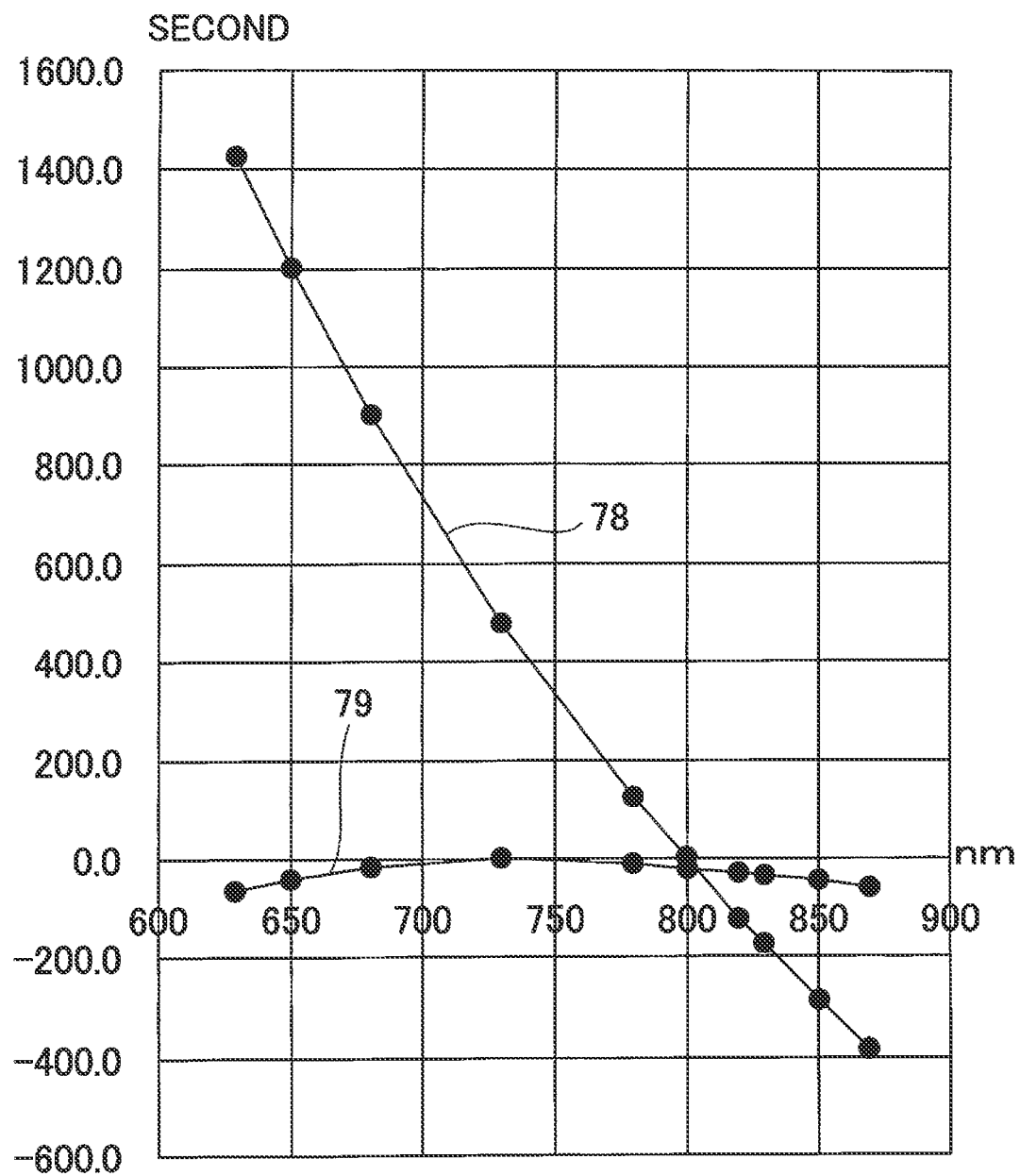
FIG. 4 is a graph showing a relationship between wavelength and an error in the wavelength dispersion compensation prism according to the present embodiment and a normal optical prism.

FIG. 4 is a graph showing an error example with respect to a wavelength of the light, such as the reflected tracking light when deflection angles of the distance measuring light optical axis 39 and the detecting light optical axis 44 are set 30°. In FIG. 4, a reference numeral 78 denotes an error when normal prisms (triangular prisms) are used, and a reference numeral 79 denotes an error when the wavelength dispersion compensation prisms 55 and 56 are used.

As shown in FIG. 4, in a case where in normal prism, the light with a wavelength of approximately 800 nm is used, almost no error causes (causes no dispersion) due to a single wavelength. However, in a case where in the normal prism, when a wavelength band of the light to be used is extended, the error dramatically increases (the dispersion is produced). For example, in a case where an image is acquired by using the light in a wavelength band of 650 nm to 850 nm, a large dispersion is produced in the range of approximately −400.0 to 1400.0 seconds, and an acquired image becomes a significantly blurred image. To reduce the blur with the normal prism, the wavelength band must be narrowed, and the dispersion must be decreased. In this case, a sufficient light amount cannot be obtained, and a dark image is produced, and hence an exposure time must be increased in order to acquire a sufficient light amount and a bright image.

On the other hand, in a case where when the wavelength dispersion compensation prisms 55 and 58 are used, the dispersion can be decreased to the range of −100.0 to 0.0 second even in the wavelength band of 650 nm to 850 nm, Thus, even if the exposure time is short, a less-blurred fine image with a sufficient light amount can be acquired, and a precise sighting or an image tracking is enabled.

The light projecting lens 33, the beam splitter 34, and the reflecting mirror 36, the distance measuring light deflector (the first optical axis deflector), and the like make up a distance measuring light projecting optical system. Further, the split mirror 49, the focusing lens 41, the reflected distance measuring light deflector (the second optical axis deflector), and the like make up a detecting light projecting optical system. Further, the distance measuring light deflector (the first optical axis deflector), the focusing lens 46, and the like make up a narrow angle image pickup optical system.

The wide angle image pickup module 14 has a wide angle image pickup optical axis 66, which is parallel to the reference optical axis O of the surveying instrument 1, and an image pickup lens 67 and a wide angle image pickup element 68 which are arranged on the wide angle image pickup optical axis 66. The wide angle image pickup module 14 has an angle of view which is equivalent or substantially equivalent to a maximum deflect on range (e.g., a deflection angle±35°) provided by the optical axis deflector 26, and the wide angle image pickup module acquires an image data including the maximum deflection range.

The distance measurement arithmetic module 15 controls the light emitter 32 and makes the light emitter 32 to pulse-emit or burst-emit (intermittently emits) a laser beam as the distance measuring light 37. The projecting optical axis 31 is deflected by the wavelength dispersion compensation prisms 55 and 58 (the distance measuring deflector) in such 4a manner that the distance measuring light 37 is directed toward the object. In a state where the distance measuring optical axis 39 has sighted the object, the distance measurement of a sighting position (a measuring point) of the object is performed.

The reflected distance measuring light 38 reflected from the object enters through the triangular prisms 56b and 56c, the triangular prisms 57b and 57c (the reflected distance measuring light deflector) and the focusing lens 41, and is received by the photodetector 42. The photodetector 42 transmits a photodetecting signal to the distance measurement arithmetic module 15. The distance measurement arithmetic module 15 performs the distance measurement of a measuring point (a point irradiated with the distance measuring light) every pulsed light based on the photodetecting signal from the photodetector 42, and the distance measurement data are stored in the storage module 17.

The projecting direction detector 19 counts driving pulses input to the motors 63 and 65, and detects rotation angles of the motors 63 and 65. Alternatively, based on signals from the encoders, the rotation angles of the motors 63 and 65 are detected. Further, the projecting direction detector 19 calculates rotating positions of the disk prisms 53 and 54 based on the rotation angles of the motors 63 and 65. Further, the projecting direction detector 19 calculates a deflection angle and a projecting direction of the distance measuring light 37 every pulsed light based on refraction indexes and the rotating positions of the disk prisms 53 and 54. A calculation result (an angle measurement result) is associated with a distance measurement result, and input to the arithmetic control module 16. It is to be noted that, when the distance measuring light 37 is burst-emitted, the distance measurement and the angle measurement are performed every intermittent distance measuring light.

The arithmetic control module 16 controls respective rotation amounts and rotating directions of the motors 63 and 65, thereby the arithmetic control module 16 enables a deflection amount and a deflecting direction of the distance measuring optical axis 39 by the optical axis deflector 26 to control. Further, the arithmetic control module 16 controls respective rotating directions and rotation speeds of the motors 63 and 65 and a rotation ratio between the motors 63 and 65, thereby the arithmetic control module enables a deflecting operation by the optical axis deflector 26 to dynamically control and enables the distance measuring optical axis 39 to scan in an arbitrary direction or according to an arbitrary pattern.

A description will be given on a deflecting operation and a scan operation by the optical axis deflector 26 by referring to FIG. 2, FIG. 3, and FIG. 5.

Figure 2:
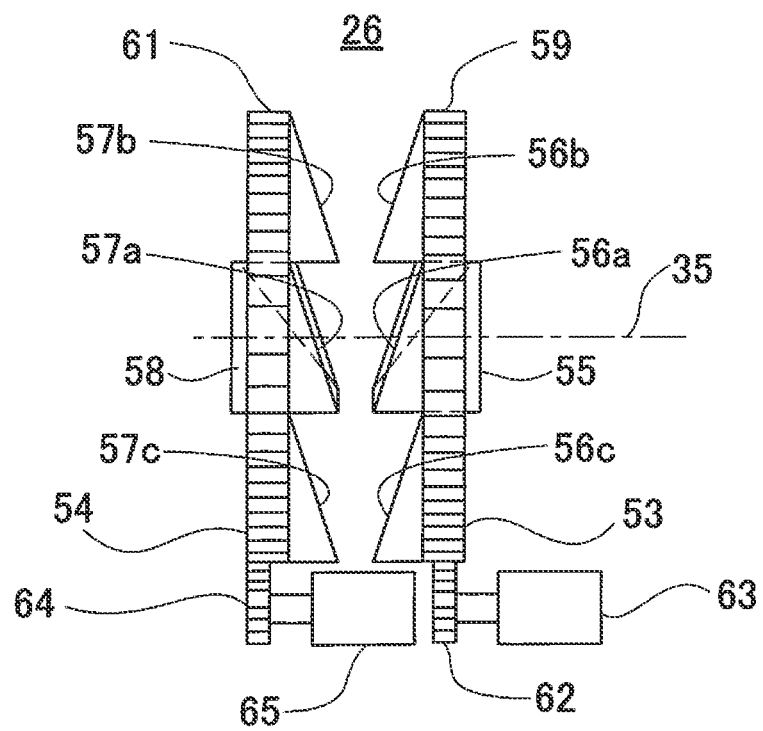
FIG. 2 is a front elevation of an optical axis deflector in the surveying instrument.

FIG. 2 shows a state where the triangular prisms 56a, 56b, and 56c and the triangular prisms 57a, 57b, and 57c are placed in the same direction, and a maximum deflection angle (e.g., ±30°) can be acquired in this state. Further, in FIG. 3A, any one of the disk prisms 53 and 54 is at a position rotated 180°, and mutual optical operations of the disk prisms 53 and 54 are offset, and a minimum deflection angle (0°) is acquired. Thus, an optical axis (the distance measuring optical axis 39) of a pulsed laser beam projected and received through the disk prisms 53 and 54 coincides with the reference optical axis O.

The distance measuring light 37 is emitted from the light emitter 32, and the distance measuring light 37 is turned to a parallel light flux by the light projecting lens 33, transmitted through the distance measuring light deflector (the wavelength dispersion compensation prisms 55 and 58), and projected toward the object. Here, by being transmitted through the distance measuring light deflector, the distance measuring light 37 is deflected and projected in a necessary direction by the wavelength dispersion compensation prisms 55 and 58. It is to be noted that since the distance measuring light 37 is a laser beam having a single wavelength or a substantially single wavelength, a slight dispersion is caused when being transmitted through the optical axis deflector 26.

The reflected distance measuring light 38 as reflected by the object is transmitted through the reflected distance measuring light deflector, enters the light receiving module 12, and is focused on the photodetector 42 by the focusing lens 41.

When the reflected distance measuring light 38 is transmitted through the reflected distance measuring light deflector, an optical axis of the reflected distance measuring light 38 is deflected by the triangular prisms 56b and 56c and the triangular prisms 57b and 57c so as to coincide with the light receiving optical axis 35.

Figure 5:
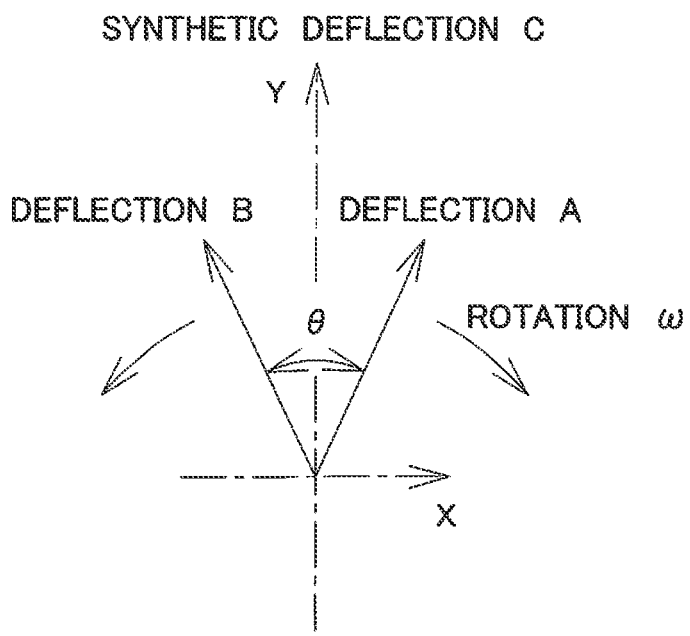
FIG. 5 is an explanatory drawing illustrating a relationship between a deflecting direction of each disk prism and a synthetic deflecting direction.

FIG. 5 shows a case where the di k prism 53 and the disk prism 54 are relatively rotated each other. Assuming that a deflecting direction of an optical axis deflected by the disk prism 53 is a deflection A and a deflecting direction deflected by the disk prism 54 is a deflection B, the deflections of the optical axes provided by the disk prisms 53 and 54 becomes a synthetic deflection C when an angular difference θ is present between the disk prisms 53 and 54.

A combination of rotating posit ions of the disk prism. 53 and the disk prism 54 enables a deflecting direction and a deflection angle of the distance measuring light 37 as projected to arbitrarily change.

Further, in a state where a positional relationship between the disk prism 53 and the disk prism 54 is fixed (in a state where a deflection angle acquired by the disk prism. 53 and the disk prism 54 is fixed), by integrally rotating the disk prism 53 and the disk prism 54 by the motors 63 and 65, a locus (a scan pattern) drawn by the distance measuring light 37 as transmitted through the distance measuring light deflector forms a circle with the reference optical axis O as a center. Further, a combination of the rotation of the disk prism 53 and the rotation of the disk prism 54 enables forming a necessary two-dimensional closed loop scan pattern.

The arithmetic control module 16 calculates a horizontal angle and a vertical angle of a measuring point with respect to the reference optical axis O from a deflection angle and a projecting direction of the distance measuring light 37, i.e., detection results of the projecting direction detector 19. Further, by associating the horizontal angle and the vertical angle with respect to the measuring point with the distance measurement data, the arithmetic control module 16 is able to acquire the three-dimensional data of the object.

The wide angle image pickup control module 23 controls photographing of the wide angle image pickup module 14. The wide angle image pickup control module 23 synchronizes a timing for acquiring a frame image constituting a video image or the continuous image with a timing for performing the distance measurement by the surveying instrument 1 when the wide angle image pickup module 14 acquires the video image or the continuous image. Further, in a case of acquiring an image by the narrow angle image pickup module 71 (see FIG. 1), the timing for acquiring an image by the narrow angle image pickup module 71 is synchronized with the timing for performing the distance measurement.

The narrow angle image pickup module 71 acquires an image of an irradiation point of the distance measuring light 37, and hence the narrow angle image pickup module 71 functions as a finder for a distance measurement portion. Further, since an image as acquired is an image of a narrow angle of view (e.g., 5°) near the distance measuring optical axis 39, a distortion is small. Further, since an image acquired by the narrow angle image pickup module 71 is acquired with the use of a background light alone which has been transmitted through the wavelength dispersion compensation prisms 55 and 58, the dispersion of the wavelength is compensated, and a less-distorted or less-blurred fine image is acquired.

Here, in an image acquired by the narrow angle image pickup module 71, when a synthetic deflection C direction is determined as a axis direction (see FIG. 5), a magnification in the Y axis direction changes in correspondence with a magnitude of an angular difference θ between the disk prism 53 and the disk prism 54.

Figure 6A:
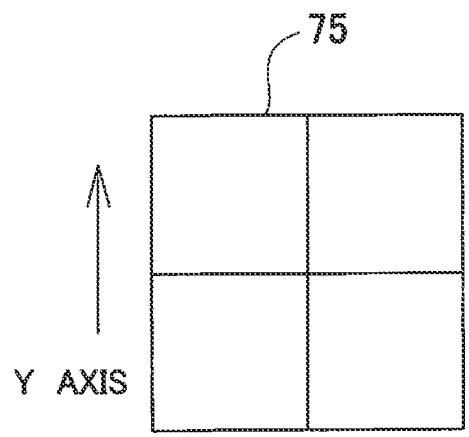
FIG. 6A shows a narrow-angle image in a state where a magnification in a Y axis direction is not changed.
Figure 6B:
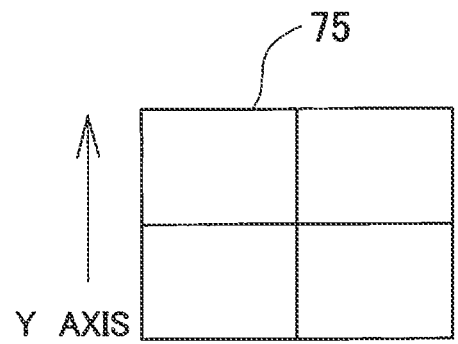
FIG. 6B shows a narrow angle image in a state where the magnification in the Y axis direction is changed.

Each of FIG. 6A and FIG. 6B shows a narrow angle image 75 acquired by the narrow angle image pickup module 71.

FIG. 6A shows a case where the magnification in the Y axis direction of the narrow angle image 75 does not changed. Further, FIG. 6B shows a case where the magnification in the Y axis direction of the narrow angle image 75 changes and the narrow angle image 75 contracts in the axis direction.

Figure 7:
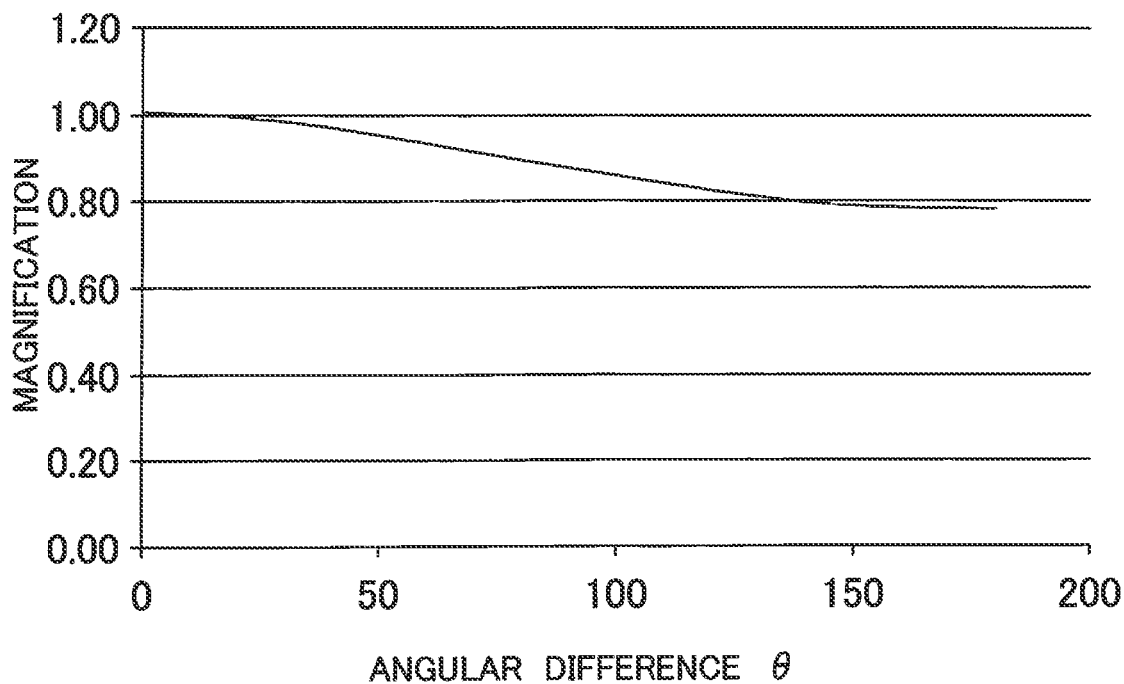
FIG. 7 is a graph showing an angular difference of each disk prism and a change of magnification in the Y axis direction.

Further, FIG. 7 is a graph showing a relationship between the angular difference between the disk prism. 53 and the disk prism 54 and a change in magnification in the axis direction. As shown in FIG. 7, regarding the narrow angle image 75, the magnification in the Y axis direction changes as the angular difference θ increases, and the magnification in the Y axis direction changes by up to approximately 20%. For example, as shown in FIG. 3A, in a state where the disk prisms 53 and 54 are arranged so that a minimum deflection angle can be acquired, the angular difference is assumed θ=0°. The narrow angle image 75 contracts in the Y axis direction as the angular difference θ increases. On the other hand, as shown in FIG. 2, in a state where the disk prisms 53 and 54 are arranged so that a maximum deflection angle can be acquired, the angular difference is assumed θ=0°. The narrow angle image 75 contracts in the Y axis direction at most, and the narrow angle image 75 expands in the Y axis direction as the angular difference θ increases. Further, a relationship between the angular difference θ and the magnification in the Y axis direction can be known in advance by, e.g., performing the actual measurement. Thus, the image processor 24 can acquire the angular difference θ (see FIG. 5) from a detection result of the projecting direction detector 19, correct the magnification, and restore an original image.

The arithmetic control module 16 also performs associating an image of a narrow angle of view (a narrow angle image) with the measurement data (the distance measurement data, the angle measurement data).

The wide angle image pickup element 68 is a CCD or a CMS sensor which is an aggregation of pixels, and a position of each pixel on the wide angle image pickup element 68 can be identified. For example, each pixel has pixel coordinates in a coordinate system with the wide angle image pickup optical axis 66 as an origin, and its position on the wide angle image pickup element 68 can be identified by the pixel coordinates. Each pixel outputs the pixel coordinates together with a photodetecting signal to the arithmetic control module 16.

Therefore, sighting directions of a plurality of objects (measuring points) included in a wide angle image can be immediately recognized on the wide angle image with the use of the pixel coordinates of the wide angle image.

Further, since the wide angle image pickup optical axis 66 of the wide angle image pickup module 14 and the narrow angle image pickup optical axis 44' have a known relationship, it is easy to associate a wide angle image acquired by the wide angle image pickup module 14 with a narrow angle image acquired by the narrow angle image pickup module 71.

The image processor 24 performs an image processing, e.g., an edge extraction processing, an extraction of feature points as an image or a retroreflective detecting light, and an image matching with respect to image data acquired by the wide angle image pickup module 14 and the narrow angle image pickup module 71. The three-dimensional measurement can be performed by the image matching, and three-dimensional modeling is enabled.

Meanwhile, rough correspondence points of the wide angle image corresponding to the narrow angle image based on the deflection angle and deflecting direction detected by the projecting direction detector 19 are approximately matched. On the other hand, due to a difference in optical characteristics (magnifications, distortions) between the wide angle image pickup module 14 and the narrow angle image pickup module 71 and due to optical characteristics (wavelengths, changes in magnification) of the wavelength dispersion compensation prisms 55 and 58, the rough correspondence points are not particularly matched. Therefore, in the three-dimensional measurement using the narrow angle image, it is important to accurately extract precise correspondence points in the narrow angle image.

Further, in a case where colors are used for the wide angle image and a wavelength of a red or near-infrared light close to a wavelength of a measuring light source ID (the light emitter 32) is used for the narrow angle image, feature points extracted in the wide angle image may be different from those in the narrow angle image. Therefore, it is important to accurately extract the feature points or the retroreflective detecting light in the narrow angle image.

Further, when the image processor 24 acquires the narrow angle image, the image processor 24 corrects the narrow angle image in such a manner that the magnification in the Y axis direction becomes 1 based on a relationship between the angular difference θ and the magnification in the Y axis direction.

Further, the optical axis deflector 26 can change a deflecting direction of the distance measuring light 37, i.e., the narrow angle image pickup optical axis 44' at a high resolution. The optical axis deflector 26 acquires a plurality of narrow angle images as slightly shifted by the narrow angle image pickup module 71 while slightly deflecting a deflection angle of the narrow angle image pickup optical axis 44' based on predetermined settings in the arithmetic control module 16, Further, the projecting direction detector 19 detects a projecting direction of each narrow angle image, and the image processor 24 overlaps the narrow angle images with a fineness less than a pixel based on the plurality of slightly shifted narrow angle images and detection results of the respective projecting directions, and produces a highly minute image.

Further, the narrow angle image pickup module 27 acquires a plurality of narrow angle images while changing the deflection angle by angle steps slightly smaller than a narrow angle of view, and the image processor 24 can acquire a detailed image of a wide range by synthesizing the narrow angle images based on a detection result of the projecting direction as detected by the projecting direction detector 19.

Further, in the image processor 24, by overlapping the wide angle image and the narrow angle image at the same magnification, it is possible to correct a distortion of the wide angle image with the use of a detection result provided by the projecting direction detector 19.

The display unit 25 displays a wide angle image 74 as acquired by the wide angle image pickup module 14, and displays a narrow angle image 75 as acquired by the narrow angle image pickup module 71. Further, the display unit 25 divides a display screen, displays the wide angle image 74 as acquired by the wide angle image pickup module 14 in a part thereof, and enables an enlarged display of the narrow angle image 75 as acquired by the narrow angle image pickup module 71 and/or a local scan portion 76 as acquired by performing a local scan within a narrow angle range in other parts thereof (see FIG. 8).

Figure 8:
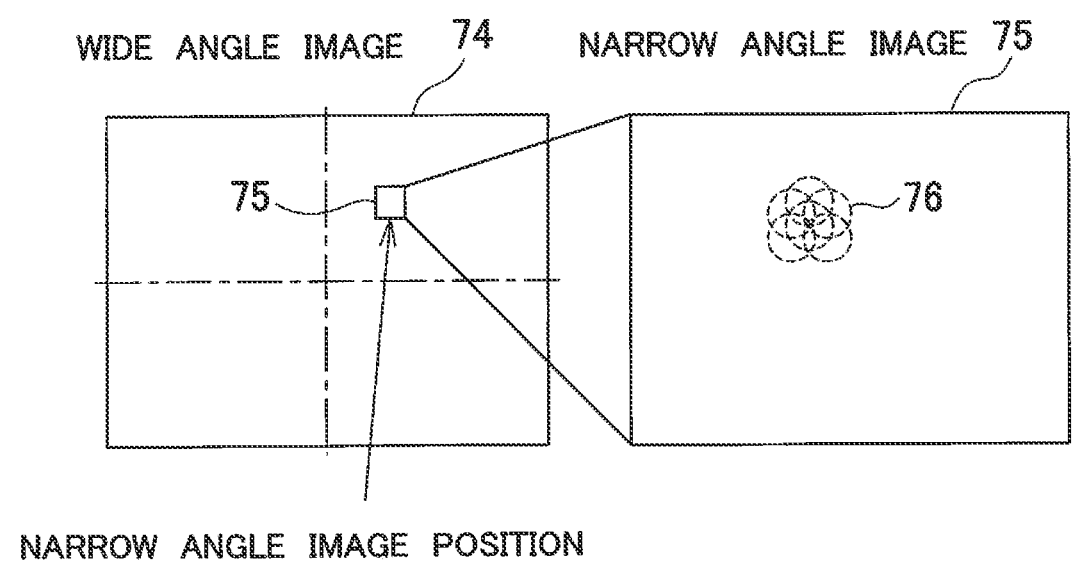
FIG. 8 is an explanatory drawing showing a relationship between a wide angle image and a narrow angle image.

Alternatively, as shown in FIG. 8, the display unit 25 displays a position of the narrow angle image 75 on the wide angle image 74. As described above, the reference optical axis O and the wide angle image pickup optical axis 66 have a known relationship. Further, a position of measuring point (a position of a pixel) in the wide angle image 74 is acquired as an angle of view with respect to the reference optical axis O, and a direction angle (a direction angle of the distance measuring light 37) of a predetermined position (e.g., an image center) of the narrow angle image with respect to the reference optical axis O is detected from the projecting direction detector 19. Therefore, the positions of the wide angle image 74 and the narrow angle image 75 are associated with each other by the angle of view in the wide angle image 74 and the direction angle of the narrow angle image 75.

As described above, the narrow angle image 75 is the same as a sighting image, and the sighting can be instantaneously changed. Therefore, by measuring three or more points on a plane of the object, a tilt of the plane can be obtained instantaneously. Further, it is needless to say that the tilt of the plane can be obtained from a measurement result of the local scan in a state where the local scan is performed.

The display unit 25 displays a measurement status, the measurement data, and the like. It is to be noted that the display unit 25 is a touch panel and can also function as an operation module. Further, the display unit. 25 provided with a touch panel function may be attachable to and removable from the surveying instrument 1 and it may be possible to carry out a remote control by using the display unit 25.

Figure 9:
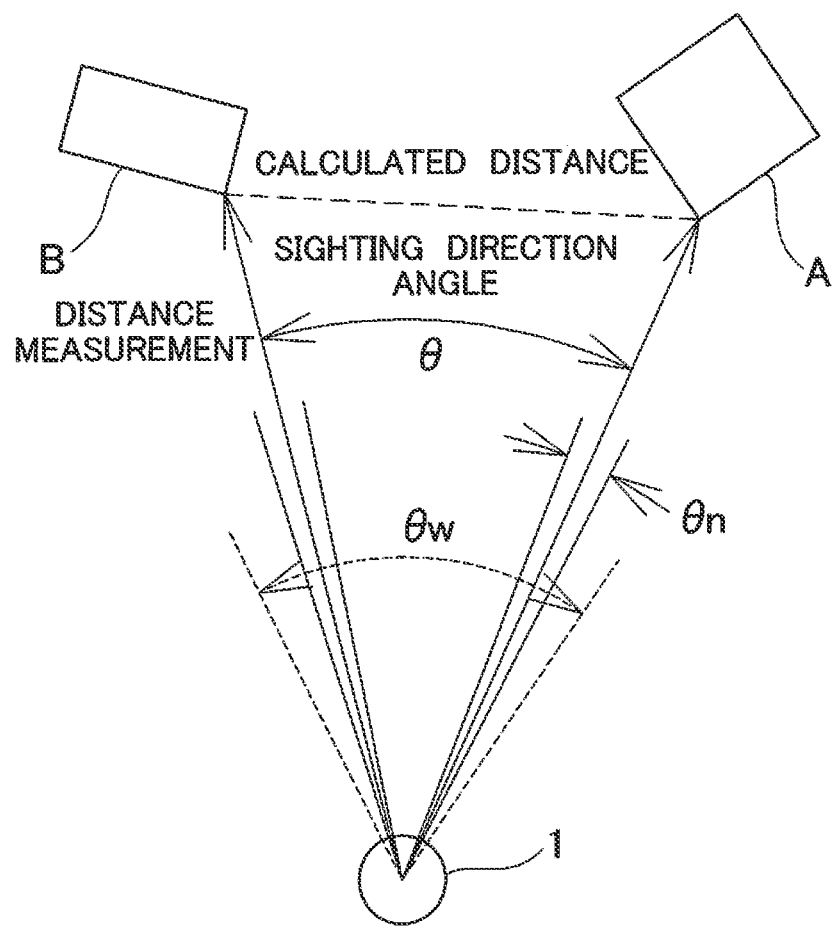
FIG. 9 is an explanatory drawing showing an example of a measuring action according to a first embodiment.

Next, a description will be given on an example of a measuring operation according to a first embodiment by referring to FIG. 9.

In the drawing, A and B denote objects respectively, θw denotes a wide angle of view of the wide angle image pickup module 14, and in denotes a narrow angle of view of the narrow angle image pickup module 71.

The surveying instrument 1 sets an direction of the surveying instrument 1 in such a manner that the objects A and B are placed within the wide angle of view θw of the wide angle image pickup module 14, that is, that images of the objects A and B are included in a wide angle image captured by the wide angle image pickup module 14.

It is to be noted that a tilt of the surveying instrument 1 with respect to the horizontality is detected by the attitude detector 18, and a measurement result can be corrected based on a detection result of the attitude detector 18.

First, a wide angle image is acquired by the wide angle image pickup module 14, and the wide angle image data of the wide angle image is input to the image processor 24. The image processor 24 extracts a feature point A, e.g., a corner or an edge of the object A from the wide angle image data, and calculates coordinates of a pixel indicative of the feature point A in the wide angle image. Further, the image processor 24 calculates a rough sighting direction of the feature point A from the calculated coordinates. It is to be noted that the rough sighting direct iron may be calculated by the arithmetic control module 16.

The rough sighting direction is input to the arithmetic control module 16, and the arithmetic control module 16 controls the optical axis deflector 26 through the motor driver 21. The distance measuring optical axis 39 is deflected by the optical axis deflector 26 so as to coincide with the rough sighting direction.

In a state where the distance measuring optical axis 39 coincides with the rough sighting direction, the narrow angle image pickup control module 27 acquires a narrow angle image with the use of the narrow angle image pickup module 71. In the narrow angle image, the distance measuring optical axis 39 does not necessarily accurately sight a feature point. The narrow angle image data is input co the image processor 24, and the image processor 24 extracts the exact feature point A of the object A from the narrow angle image data and calculates coordinates of a pixel indicative of the feature point A in the narrow angle image. Further, the arithmetic control module 16 calculates a deviation between the calculated coordinates and the sighting direction of the distance measuring optical axis 39, controls the optical axis deflector 26 in such a manner that the deviation becomes 0, and adjusts the direction angle of the distance measuring optical axis 39. A precise sighting direction A of the distance measuring optical axis 39 of when the deviation has become 0 is accurately detected by the projecting direction detector 19.

It is to be noted that, in case of extracting the exact feature point A, if applied a reflecting member with retroreflective characteristics to the object, since the feature point can be extracted based on the retroreflective light from the object point as the detecting light, the extracting work can be facilitated and carried out with a high accuracy.

In a state where the precise sighting direction. A coincides with the distance measuring optical axis 39, a distance measurement of the exact feature point A of the object A is performed.

Then, as to the object B, likewise, a feature point B of the object B is extracted from the wide angle image data, and a rough sighting direction of the feature point B is calculated.

The distance measuring optical axis 39 is deflected by the optical axis deflector 26 in such a manner that the distance measuring optical axis 39 coincides with the rough sighting direction of the feature point B. Further, a narrow angle image is acquired by the narrow angle image pickup module 71, the exact feature point B of the object B is extracted from the narrow angle image, and a precise sighting direction B of the exact feature point B is calculated. The distance measuring optical axis 39 is deflected by the projecting direction detector 19 in such a manner that the distance measuring optical axis 39 coincides with the precise sighting direction B.

In a state where the distance measuring optical axis 39 coincides with the precise sighting direction, a distance measurement of the exact feature point B of the object B is performed. The precise sighting direct on B is accurately detected by the projecting direction detector 19, and an angle θ between the precise sighting; direction A and the precise sighting direction B is calculated based on the precise sighting direction A and the precise sighting direction B.

When the distance measurements of the exact feature point A and the exact feature point B are performed and the angle θ between the precise sighting direction A and the precise sighting direction B is acquired, a distance between the exact feature point A and the exact feature point B is determined based on the measurements and the angle θ.

Thus, once the surveying instrument 1 is installed, the distance between the exact feature point A and the exact feature point B can be determined without changing a direction of the surveying instrument 1.

It is to be noted that the exact feature point A and the exact feature point B are explained in the above description, but an arbitrary object or a measuring point included in the wide angle image or a distance between arbitrary two points included in the wide angle image can be rapidly and exactly measured without changing an orientation of the surveying instrument 1.

Next, in FIG. 9A to FIG. 11, a description will be given on a second embodiment.

In the second embodiment, a surveying instrument main body 81 and a support device 82 are provided, and the surveying instrument 1 described in the first embodiment is provided as the surveying instrument main body 81 on the support device 82.

It is to be noted that the surveying instrument main body 81 has the same configuration as that of the surveying instrument 1 described in the first embodiment, and hence a description thereof will be omitted.

Figure 10:
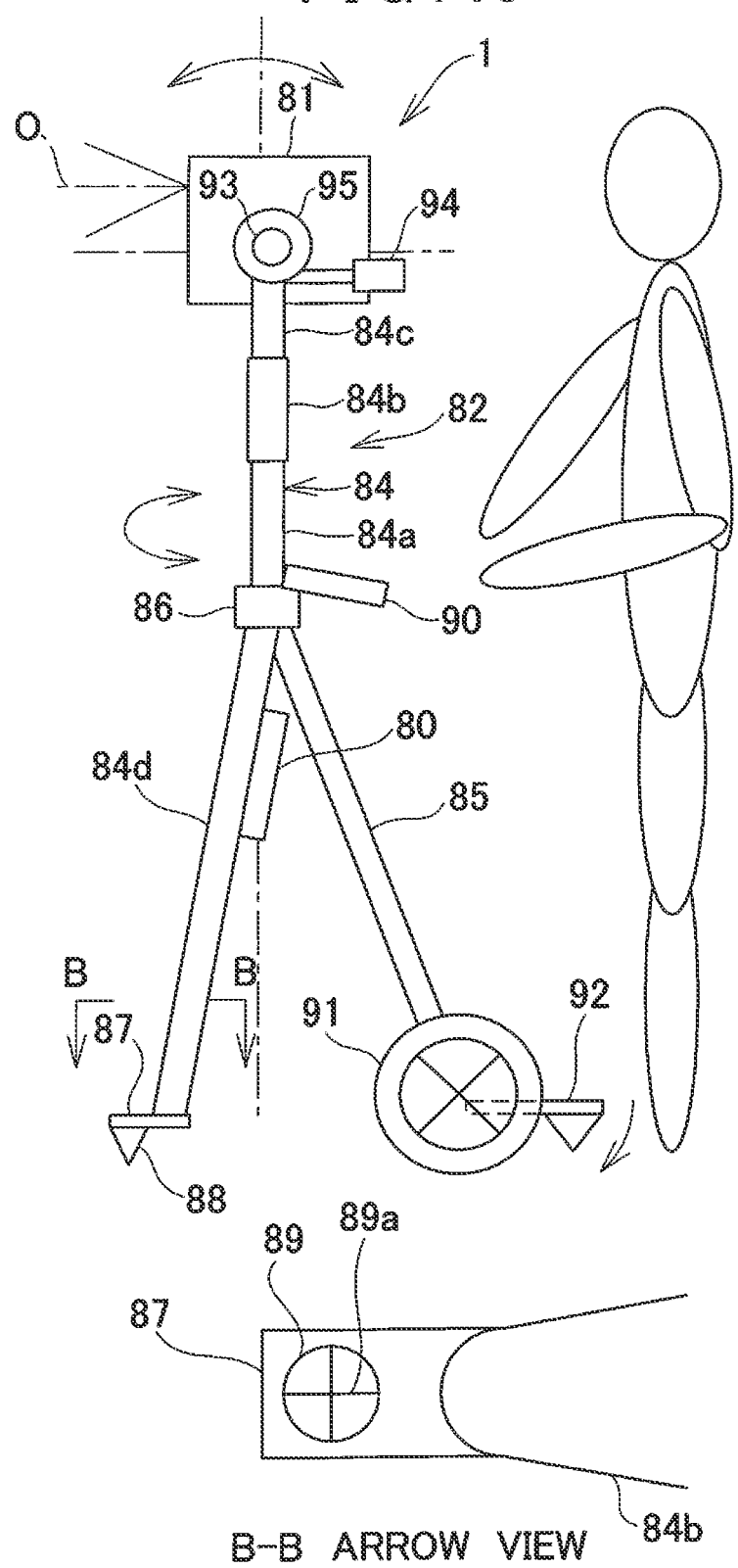
FIG. 10 is a side elevation showing a surveying instrument according to a second embodiment.
Figure 11:
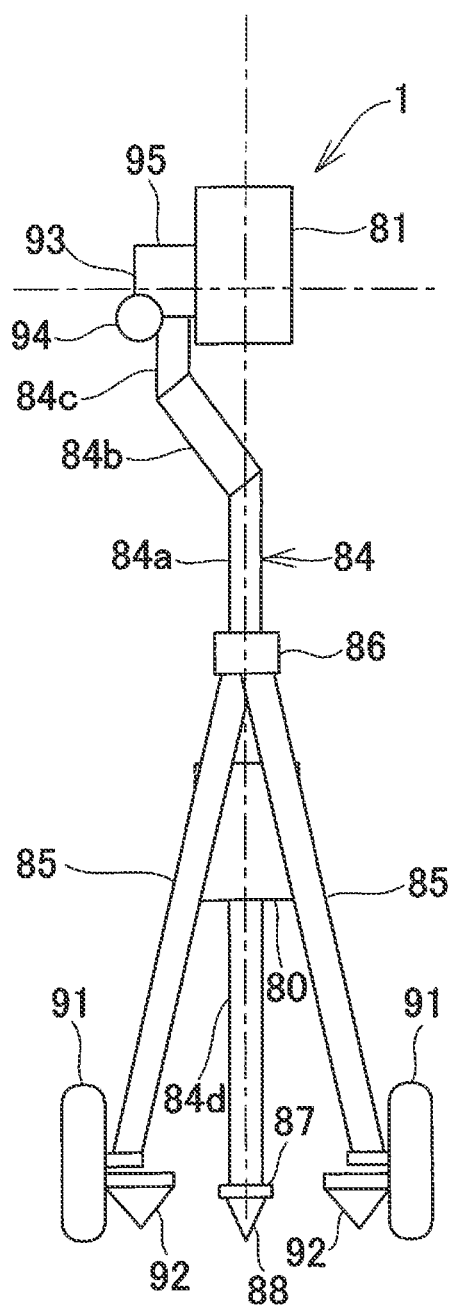
FIG. 11 is a back elevation showing the surveying instrument according to the second embodiment.

Further, in FIG. 10, a reference numeral 80 denotes a processing control unit, and a reference numeral 90 denotes an operation panel. In the processing control unit 80, for example, a high-performance arithmetic processor and a high-capacity battery are accommodated. The operation panel 90, the surveying instrument main body 81, and the processing control unit 80 can perform the data communication through various kinds of communicating means, e.g., a wired or wireless means. It is to be noted that, when the high-performance arithmetic processor, the high-capacity battery, and the like are unnecessary, the processing control unit 80 may be omitted.

The operation panel 90 may be fixedly provided on or may be attachable to and removable from the monopod 84. Further, when the operation panel 90 is attachable/detachable, the operation panel 90 may be removed from the monopod 84, a worker may hold and operate the operation panel 90 as a single body.

The support device 82 includes the monopod 84 and two auxiliary legs 85.

The monopod 84 includes a vertical portion 84a extending in the up-and-down direction, a bending portion 84b which makes the surveying instrument main body 81 offset in the horizontal direction so that a machine center of the surveying instrument main body 81 is positioned on an axis extension of the vertical portion 84a, a support portion 84c extending upward from an upper end of the bending portion 84b, a leg coupling portion 86 which couples legs provided at a lower end of the vertical portion 84a, and a leg portion 84d extending downward from a lower end of the leg coupling portion 86 while tilting toward a sighting direction. Here, to the leg coupling portion are mounted a mechanism which stops or suppresses a lateral rotation in the horizontal direction and a lateral rotation angle encoder which detects a lateral rotation angle as required (not shown).

A reference plate 87 is provided to a lower end of the leg portion 84d, and a ferrule 88 is provided on a lower surface of the reference plate 87. The ferrule 88 has a tapered shape, and its lower end is a pointed end. A distance between the lower end and the machine center of the surveying instrument main body 81, and a positional relationship between the lower end and a reference optical axis O are known.

Further, a reference index 89 is provided (marked) on an upper surface of the reference plate 87, and the reference index 89 indicates a position of an apex of the ferrule 88. Further, one (a reference line 89a) of cross lines of the reference index 89 is parallel to the reference optical axis O of the surveying instrument main body 81, and a tip side of the reference line 89a is a sighting direction (a direction of the reference optical axis O) of the surveying instrument main body 81.

It is to be noted that the vertical portion 84a is rotatable around an axis of the vertical portion 84a with respect to the leg portion 84d and the auxiliary legs 85, and a relative rotation angle with respect to the leg portion 64d and the auxiliary legs 85 can be detected by the lateral rotation angle encoder mounted on the leg coupling portion 86.

Each of the two auxiliary legs 85 can rotate on an upper end thereof at a predetermined angle in a direction to Get close to or away from the monopod 84, and can be fixed at a position where each leg has rotated. A wheel 91 is rotatably provided at a lower end of each of the auxiliary legs 85. The surveying instrument 1 can stand on its own by the monopod 84 and the two auxiliary legs 85.

It is to be noted that the surveying instrument main body 81 may be mounted on the monopod 84 in such a manner that the axis of the monopod 84 becomes orthogonal to the reference optical axis O, or may be mounted on the monopod 84 in such a manner that the reference optical axis O becomes approximately horizontal when the surveying instrument 1 is made to stand on its own.

A shaft portion 93 and a lever 94 extending from the shaft portion 93 are provided on a side surface of the surveying instrument main body 81. Further, a longitudinal rotation angle encoder 95 as a longitudinal rotation detecting means for detecting a rotation angle in the vertical direction is provided on the shaft portion 93, The shaft portion 93 is rotatably coupled to an upper end of the support portion 84c, and by moving the lever 94 up and down, the surveying instrument main body 81 is designed to rotate in the longitudinal direction. Further, by moving the lever 94 in the left-and-right direction, the surveying instrument main body 81 is designed to rotate in the lateral direction integrally with the support portion 84c, the bending portion 84b, and the vertical portion 84a. Further, by twisting the lever 94, the lateral rotation and the longitudinal rotation are locked.

A rotation angle in the longitudinal direction of the surveying instrument main body 81 at this moment, e.g., a rotation angle (an elevation angle) in the vertical direction with respect to the horizontality is detected by the longitudinal rotation angle encoder 95. Further, a rotation angle in the horizontal direction of the surveying instrument main body 81, e.g., the rotation angle (a horizontal angle) in the horizontal direction with respect to the reference optical axis O, in which a direction of when a reference line 89a of the reference index 89 and the reference optical axis O become parallel is determined as a reference direction, is detected by the lateral rotation angle encoder mounted on the leg coupling portion 86. The rotation angles detected by the lateral rotation angle encoder and the longitudinal rotation angle encoder 95 are input to the arithmetic control module 16 of the surveying instrument main body 61, respectively.

It is to be noted that a machine center of the surveying instrument main body 81 is positioned above an axis of the vertical portion 84a, and the reference optical axis O crosses the axis of the vertical portion 84a.

Further, a protrusion 92 as a fixing means is provided to each wheel 91 in a protrudable and retractable manner, and the respective protrusions 92 are retracted in a moving state of the surveying instrument 1 whilst the protrusions 92 are protruded in an installed state of the surveying instrument 1. A protruding state of the protrusions 92 is fixed in a state where the wheels 91 are slightly lifted from an installation surface. At this moment, the surveying instrument main body 81 is supported on three points in a state where the ferrule 88 and the two protrusions 92 are in contact with the installation surface.

In the second embodiment, like the first embodiment, the surveying instrument 1 may be installed at a Predetermined position, a direction of the surveying instrument main body 81 is fixed, and the measurement of an object within the range of a wide angle of view Ow may be performed.

Further, in the second embodiment, in a case where the lateral rotation angle encoder is included, when an direction of the surveying instrument main body 81 changes, an angle of the changed direction can be detected by the lateral rotation angle encoder, and hence the measurement can be performed in wider range.

In the second embodiment, the surveying instrument main body 81 is supported by; the support device 82, the surveying instrument 1 can be readily moved, and hence measurements can be easily carried out from a plurality of points.

A description will now be given on a surveying instrument system including the surveying instrument according to this embodiment hereinafter by referring to FIG. 12 and FIG. 13.

Figure 12:
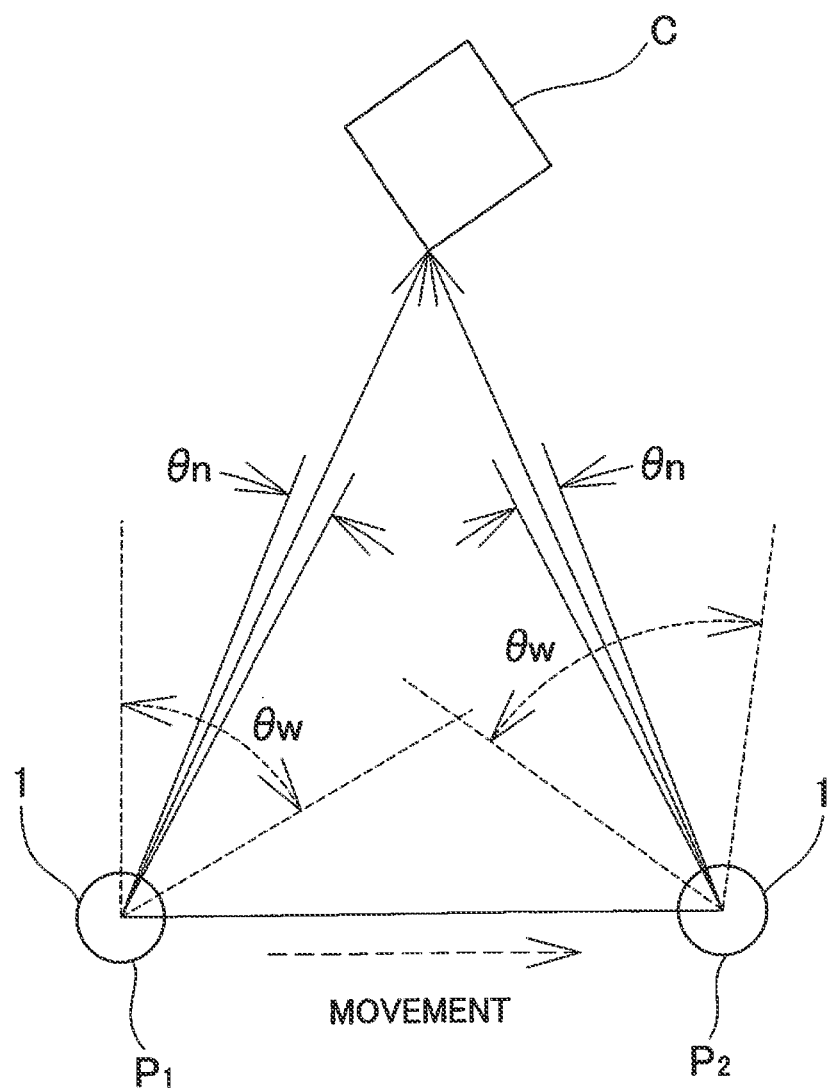
FIG. 12 is an explanatory drawing showing an example of a measuring operation of a surveying instrument system according to the present embodiment.
Figure 13:
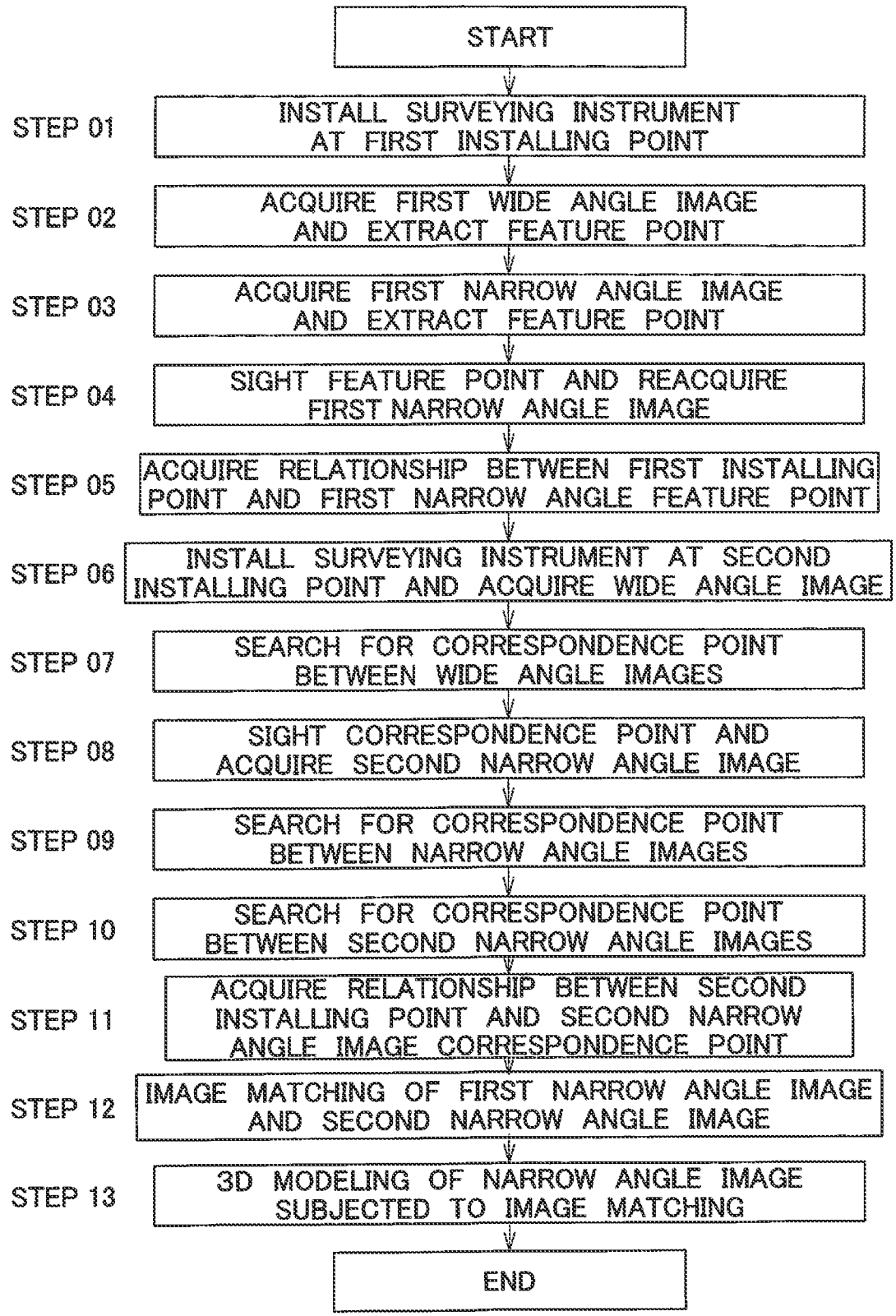
FIG. 13 is a flowchart showing the measuring operation of the surveying instrument system.

In FIG. 12, C represents an object, P1 represents a first installation point of the surveying instrument 1, and P2 represents a second installation point of the surveying instrument 1. Further, the first installation point P1 and the second installation point P2 are known. It is to be noted that any one of the first installation point P1 and the second installation point P2 may be set as a known point, and the other one may be measured by the surveying instrument 1. Further, as a method for setting the installation point as a known point, a GNSS device 97 may be provided to the surveying instrument main body 81, and coordinates of a GNSS coordinate system may be acquired for the installation point by the GNSS device 97.

Further, in FIG. 12, Ow denotes a wide angle of view of the wide angle image pickup module 14, and θn denotes a narrow angle of view of the narrow angle image pickup module 71 (see FIG. 1).

(STEP 01) The surveying instrument 1 is installed at the first installation point P1, the surveying instrument main body 81 is directed toward the object C, and an direction of the surveying instrument main body 81 is set in such a manner that the object C is included in an angle of view (a wide angle of view) of the wide angle image pickup module 14. An attitude of the surveying instrument main body 81 in the installed state is acquired by the attitude detector 18.

(STEP 02) A first wide angle image of the object at the first installation point P1 is acquired by the wide angle image pickup module 14, and the image processor 24 extracts a first wide angle feature point of the object C from the first wide angle image. The arithmetic control module 16 controls the optical axis deflector 26, and sights the wide angle feature point in the first wide angle image.

(STEP 03) A first narrow angle image is acquired by the narrow angle image pickup module 71 without changing a sighting direction. Further, the image processor 24 extracts a first narrow angle feature point in the first narrow angle image. It is to be noted that the feature point in the first narrow angle image may coincide with or may be different from the feature point in the first wide angle image.

(STEP 04) The first narrow angle feature point is sighted, the narrow angle image pickup module 71 reacquires the first narrow angle image, the distance measurement arithmetic module 15 performs the distance measurement of the first narrow angle feature point. The arithmetic control module 16 acquires a distance measurement result, and acquires a projecting direction (a sighting direction) at the time the distance measurement by the attitude detector 16.

(STEP 05) The arithmetic control module 16 obtains a relationship between the first installation point P1 and the first narrow angle feature point with reference to the first installation point P1 based on a result of the attitude detection, a distance measurement result, a projecting direction detection result, and a known shape of the monopod (the bending and length of the leg).

(STEP 06) The surveying instrument 1 is moved and installed on the second installation point P2. The surveying instrument main body 81 is directed toward a direction in which the object C is included in an angle of view of a wide angle image, and the wide angle image pickup module 14 acquires a second wide angle image. The arithmetic control module 16 acquires an attitude detection result of the attitude detector 18.

(STEP 07) The image processor 24 extracts each rough correspondence point, which is common to the first wide angle image and the second wide angle image, from the first wide angle image and the second wide angle image (the search for the correspondence point of the feature point).

(STEP 08) The rough correspondence point in the second wide angle image is sighted, and a second narrow angle image is acquired.

(STEP 09) A precise correspondence point in the second narrow angle image corresponding to the feature point in the first narrow angle image sighted at STEP: 07 is extracted (the search for the correspondence point of the feature point).

(STEP 10) A precise correspondence point in the second narrow angle image is sighted, and the narrow angle image pickup module 71 reacquires the second narrow angle image. The distance measurement arithmetic module 15 performs a distance measurement of the correspondence point, acquires a distance measurement result, and also acquires a projecting direction (a sighting direction) in the distance measurement via the attitude detector 18.

(STEP 11) The arithmetic control module 16 obtains a relationship between the second installation point P2 and the correspondence point of the second narrow angle image with reference to the second installation point P2 based on a result of the attitude detection, a distance measurement result, a projecting direction detection result, and a known shape of the monopod (the bending and a length of the leg).

(STEP 12) The arithmetic control module 16 performs the image matching of the first narrow image acquired at STEP: 04 and the second narrow angle image acquired at STEP: 10.

(STEP 13) The arithmetic control module 16 combines three-dimensional coordinates with the narrow angle images subjected to the image matching at STEP: 12 based on a relationship of the feature point in the first narrow angle image to the first installation point P1, a relationship of the precise correspondence point of the second narrow angle image to the second installation point P, and a relationship between the first installation point P1 and the second installation point P2 (the local 3D modeling using the narrow angle image). That is, the detailed three-dimensional measurement in the narrow angle image is carried out.

In the other measurement methods, a minute local 3D model is acquired by using minute images, minute local 3D models of necessary positions and of a necessary number are acquired.

Further, by synthesizing a plurality of local 3D models a minute 3D model of a wide range can be produced. In this case, in the each local 3D model, since the three-dimensional coordinates of the feature point and the correspondence point with reference to the first installation point P1 and the second installation point P2 are known by the measurement of the surveying instrument main body 81, the synthesizing work can be easily carried out.

Further, by providing the GNSS device 97 to the surveying instrument main body 81, a three-dimensional measurement result as obtained by the surveying instrument main body 81 can be converted into a GNSS coordinate system.

Further, the minute 3D models acquired at a plurality of positions or arbitrary positions can be integrated in the GNSS coordinate system. Further, in case of integrating in the GNSS coordinate system, the integration can be carried out irrespective of an order of the measurement or a measurement timing, a work time limitation, a work procedure limitation, and the like are no longer imposed.

Further, in this embodiment, by wide angle images acquired from two positions, the rough association of the sighting directions. Therefore, an image matching of a plurality of narrow angle images acquired from two positions and an association of a distance measurement result are automatically carried out, and thereby the detailed three-dimensional measurement in the plurality of narrow angle images becomes possible.

Meanwhile, in general, in a measurement of a object, in order to determine a direction a measurement of the object with respect to a point (a back point) serving as a reference is carried out, and the detailed three-dimensional measurement can be treated as detailed three dimensions of the object serving as a reference standard (a reference standard object). Therefore, in case of sighting the reference standard object as a back point, the unconventional convenient sighting can be realized, namely, sighting a detailed three-dimensional arbitrary position can suffice (the image matching with a narrow angle image of the reference standard object can be also used).

The invention claimed is:

1. A surveying instrument comprising: a distance measuring light projecting module for projecting a distance measuring light, a light receiving module for receiving a reflected distance measuring light, an optical axis deflector provided in a common portion of a distance measuring optical axis and a light receiving optical axis and for integrally deflecting said distance measuring optical axis and said light receiving optical axis, a projecting direction detector for detecting an optical axis deflection angle and a deflecting direction provided by said optical axis deflector, a wide angle image pickup module with an angle of view ($\theta$w) equivalent to a maximum deflection range of said optical axis deflector, a narrow angle image pickup module having a narrow angle image pickup optical axis which is partially shared with said distance measuring optical axis and having an angle of view ($\theta$n) narrower than the angle of view ($\theta$w) of said wide angle pickup module, a distance measurement arithmetic module, and an arithmetic control module, wherein said arithmetic control module is configured to control the optical axis deflection of said optical axis deflector and a distance measurement operation of said distance measurement arithmetic module, said distance measurement arithmetic module is configured to perform the distance measurement of a measuring point based on a transmission signal of said distance measuring light and a photodetecting signal of said reflected distance measuring light, said narrow angle image pickup module is configured to acquire a narrow angle image with reference to said distance measuring optical axis, to sequentially sight every different objects, and to acquire narrow angle images and to perform three-dimensional measurements.

2. The surveying instrument according to claim 1, wherein wavelength dispersion compensation prisms including a plurality of optical members with different wavelength characteristics are provided in a common portion of said distance measuring optical axis of said optical axis deflector and said narrow angle image pickup optical axis.

3. The surveying instrument according to claim 2, wherein said optical axis deflector is configured to perform a local scan by deflecting or continuously defecting said distance measuring optical axis within an angle-of-view range of said narrow angle image, and said arithmetic control module is configured to perform, more than once, a distance measurement while changing a sighting position or a distance measurement using the local scan and a narrow angle image acquisition while changing the sighting position.

4. The surveying instrument according to claim 2, wherein said arithmetic control module is configured to associate a wide angle image acquired by said wide angle image pickup module with said narrow angle image based on a detection result of a projecting direction of said distance measuring light detected by said projecting direction detector.

5. A surveying instrument system comprising: the surveying instrument according to claim 2, wherein said surveying instrument is installed sequentially on at least two installation points with a known relationship respectively, wherein an object is sighted from respective installation points, a narrow angle image in each sighting direction is acquired, and the three-dimensional measurement of said narrow angle image is performed based on a distance measurement result from each installation point and said known relationship.

6. The surveying instrument system according to claim 5, wherein said arithmetic control module is configured to extract a common rough correspondence point from wide angle images acquired from said at least two installation points by said wide angle image pickup module, sight said rough correspondence point and acquire narrow angle images at said respective installation points, extract a precise correspondence point in said narrow angle images, acquire distance measurement results of said respective narrow angle images and said precise correspondence point, and perform a matching between said narrow angle images and a three-dimensional measurement in said narrow angle images based on said distance measurement result of said precise correspondence point.

7. The surveying instrument system according to claim 5, wherein a GNSS is provided to said surveying instrument, said object is sighted from at least two positions, the three-dimensional measurement of said narrow angle images is performed, and a measurement result is calculated to a GNSS coordinate system.

8. The surveying instrument according to claim 1, wherein said optical axis deflector is configured to perform a local scan by deflecting or continuously defecting said distance measuring optical axis within an angle-of-view range of said narrow angle image, and said arithmetic control module is configured to perform, more than once, a distance measurement while changing a sighting position or a distance measurement using the local scan, and a narrow angle image acquisition while changing a sighting position.

9. A surveying instrument system comprising: the surveying instrument according to claim 8, wherein said surveying instrument is installed sequentially on at least two installation points with a known relationship respectively, wherein an object is sighted from respective installation points, a narrow angle image in each sighting direction is acquired, and the three-dimensional measurement of said narrow angle image is performed based on a distance measurement result from each installation point and said known relationship.

10. The surveying instrument system according to claim 9, wherein said arithmetic control module is configured to extract a common rough correspondence point from wide angle images acquired from said at least two installation points by said wide angle image pickup module, sight said rough correspondence point and acquire narrow angle images at said respective installation points, extract a precise correspondence point in said narrow angle images, acquire distance measurement results of said respective narrow angle images and said precise correspondence point, and perform a matching between said narrow angle images and a three-dimensional measurement in said narrow angle images based on said distance measurement result of said precise correspondence point.

11. The surveying instrument system according to claim 9, wherein a GNSS is provided to said surveying instrument, said object is sighted from at least two positions, the three-dimensional measurement of said narrow angle images is performed, and a measurement result is calculated to a GNSS coordinate system.

12. The surveying instrument according to claim 1, wherein said arithmetic control module is configured to associate a wide angle image acquired by said wide angle image pickup module with said narrow angle image based on a detection result of a projecting direction of said distance measuring light detected by said projecting direction detector.

13. A surveying instrument system comprising: the surveying instrument according to claim 12, wherein said surveying instrument is installed sequentially on at least two installation points with a known relationship respectively, wherein an object is sighted from respective installation points, a narrow angle image in each sighting direction is acquired, and the three-dimensional measurement of said narrow angle image is performed based on a distance measurement result from each installation point and said known relationship.

14. The surveying instrument system according to claim 13, wherein said arithmetic control module is configured to extract a common rough correspondence point from wide angle images acquired from said at least two installation points by said wide angle image pickup module, sight said rough correspondence point and acquire narrow angle images at said respective installation points, extract a precise correspondence point in said narrow angle images, acquire distance measurement results of said respective narrow angle images and said precise correspondence point, and perform a matching between said narrow angle images and a three-dimensional measurement in said narrow angle images based on said distance measurement result of said precise correspondence point.

15. The surveying instrument system according to claim 13, wherein a GNSS is provided to said surveying instrument, said object is sighted from at least two positions, the three-dimensional measurement of said narrow angle images is performed, and a measurement result is calculated to a GNSS coordinate system.

16. A surveying instrument system comprising: the surveying instrument according to claim 1, wherein said surveying instrument is installed sequentially on at least two installation points with a known relationship respectively, wherein an object is sighted from respective installation points, a narrow angle image in each sighting direction is acquired, and the three-dimensional measurement of said narrow angle image is performed based on a distance measurement result from each installation point and said known relationship.

17. The surveying instrument system according to claim 16, wherein said arithmetic control module is configured to extract a common rough correspondence point from wide angle images acquired from said at least two installation points by said wide angle image pickup module, sight said rough correspondence point and acquire narrow angle images at said respective installation points, extract a precise correspondence point in said narrow angle images, acquire distance measurement results of said respective narrow angle images and said precise correspondence point, and perform a matching between said narrow angle images and a three-dimensional measurement in said narrow angle images based on said distance measurement result of said precise correspondence point.

18. The surveying instrument system according to claim 16, wherein a GNSS is provided to said surveying instrument, said object is sighted from at least two positions, the three-dimensional measurement of said narrow angle image is performed, and a measurement result is calculated to a GNSS coordinate system.

* * * * *